United States Patent [19]

Powell

[11] Patent Number: 5,276,135
[45] Date of Patent: Jan. 4, 1994

[54] STABILIZED COPOLYMERS OF ETHYLENE WITH ETHYLENICALLY UNSATURATED CARBOXYLIC ACIDS

[75] Inventor: Richard J. Powell, Orange, Tex.

[73] Assignee: E. I. Du Pont de Nemours and Company, Wilmington, Del.

[21] Appl. No.: 3,819

[22] Filed: Jan. 11, 1993

Related U.S. Application Data

[63] Continuation of Ser. No. 858,392, Mar. 20, 1992, abandoned.

[51] Int. Cl.$^5$ .............................................. C08F 6/00
[52] U.S. Cl. ................................... 528/483; 528/499
[58] Field of Search ............... 528/483, 499; 524/556; 523/326

[56] References Cited

U.S. PATENT DOCUMENTS

| | | | |
|---|---|---|---|
| 3,226,459 | 12/1965 | Tijunelis | 264/95 |
| 4,156,075 | 5/1979 | Holliday et al. | 528/483 |
| 4,372,758 | 2/1983 | Bobst et al. | 528/483 X |
| 4,528,151 | 7/1985 | Matsuo et al. | 528/483 X |
| 4,594,382 | 6/1986 | Hoenig et al. | 524/400 |
| 4,730,035 | 3/1988 | Mark et al. | 528/483 X |
| 5,071,950 | 12/1991 | Borho et al. | 528/483 |

Primary Examiner—Joseph L. Schofer
Assistant Examiner—Jeffrey T. Smith
Attorney, Agent, or Firm—Paul R. Steyermark

[57] ABSTRACT

The viscosity stability of a copolymer of ethylene with at least one comonomer which is an ethylenically unsaturated carboxylic acid is improved by exposing the isolated copolymer to moisture for a sufficient period to cause the copolymer to retain at least 20 weight percent more water than it would retain if it were purged with air or nitrogen heated to a temperature at least 5° C. above ambient, which air or nitrogen has not been humidified after it has been heated to such temperature.

4 Claims, No Drawings

STABILIZED COPOLYMERS OF ETHYLENE WITH ETHYLENICALLY UNSATURATED CARBOXYLIC ACIDS

This is a continuation of application Ser. No. 07/858,392 filed on Mar. 20, 1992, now abandoned.

BACKGROUND OF THE INVENTION

This invention relates to a process for stabilizing copolymers of ethylene with ethylenically unsaturated carboxylic acids and to stabilized copolymers made by this process.

It is well known to copolymerize ethylene with ethylenically unsaturated carboxylic acids such as, e.g., acrylic and methacrylic acids or with monoesters of unsaturated dicarboxylic acids, such as, e.g., monoethyl maleate or monomethyl maleate. Many such copolymers, sometimes hereinafter referred to as carboxylic acid copolymers. are described in the patent literature, as exemplified by U.S. Pat. Nos. 4,351,931 to Armitage, 3,520,861 to Thompson, and 5,028,674 to Hatch et al.

For safety reasons, it is a common practice in the industry to purge ethylene homopolymers and copolymers with air or nitrogen (collectively referred to hereafter as purge gas) to extract residual ethylene and any other flammable monomers present therein. This renders the polymer product "safe to package" by reducing the amount of these monomers to a level which will not reach a combustible or explosive concentration in the package air space. If purging the polymer with purge gas is not desired, volatile materials can be removed by vacuum extraction. Polymer is normally pelletized by extrusion into rods and underwater cutting, but it is then dried of surface water because the presence of undissolved moisture has always been considered undesirable. Water is known to be the main cause of die buildup from ethylene polymers and it creates undesirable bubbles during melt processing. Drying with heated purge gas results in a very dry material, although the actual amount of water will depend on the degree of hygroscopicity of the polymer, on the temperature and humidity of the purge gas, and on the duration of exposure to purge gas.

Carboxylic acid copolymers are inherently unstable at temperatures greater than about 240° C., used during melt processing, because of side reactions involving the carboxylic groups, especially, anhydride group formation, which may subsequently cause crosslinking that results in an increase of melt viscosity and decrease of melt flow. This has the practical effect of reducing the polymer drawability, as evidenced by edgewave (erratic changing of the width of an extruded melt web) and tearing, increased gel formation in the extruder, and difficulty of purging the extruder clean.

Hoening et al. describe in U.S. Pat. No. 4,594,382 thermally stabilized carboxylic acid copolymers, which contain 5 weight percent or less of a hydrated compound that loses its hydration water between 100° C. and 300° C. A possible alternative of injecting steam into the molten polymer is said in that patent to have produced unsatisfactory results and also to have the further disadvantage of adversely affecting the quality of products made from the copolymers and corroding processing equipment.

SUMMARY OF THE INVENTION

According to the present invention, there is now provided a process for improving the viscosity stability of an ethylene copolymer with at least one comonomer which is an ethylenically unsaturated carboxylic acid, said process consisting in exposing the isolated copolymer to moisture for a sufficient period to cause the copolymer to retain at least 20 weight % more moisture than it would retain after purging for about 18 hours with air or nitrogen that has been heated to a temperature at least 5° C. above ambient and has not been further humidified after being heated to a temperature of at least 5° C. above ambient.

DETAILED DESCRIPTION OF THE INVENTION

Carboxylic acid copolymers of the present invention are those generally known from the above-mentioned prior art but preferably are copolymers of ethylene with acrylic acid, copolymers of ethylene with methacrylic acid, and copolymers of ethylene with monomethyl maleate or with monoethyl maleate. As understood for the purpose of the present invention, the term "copolymer" includes not only dipolymers but also terpolymers and higher copolymers of ethylene, the principal requirement being that at least one comonomer should be an ethylenically unsaturated carboxylic acid. Many such copolymers are described in the above-cited patents and include, i.a., those containing comonomers such as vinyl esters (e.g., vinyl acetate, vinyl propionate), vinyl chloride, acrylonitrile, carbon monoxide, and acrylic and methacrylic esters (e.g., methyl acrylate or methacrylate, butyl acrylate or methacrylate, and isobutyl acrylate or methacrylate). Preferably, the amount of carboxylic acid comonomer is about 5 to 20 weight percent. Suitable copolymerization processes are known from the art. For copolymers near the upper limit of carboxylic acid comonomer, the continuous process described in U.S. Pat. No. 5,028,674, which calls for the continuous addition to the polymerization mixture of 2-25% of methanol, based on the total flow of materials through the reactor is particularly suitable.

Exposing the isolated copolymer to moisture can be accomplished in a number of ways, including spraying pellets with water, adding water or steam to the extruder in which copolymer is pelletized, and exposing pelletized copolymer to a stream of purge gas (i.e., air or nitrogen) heated to a temperature of at least 5° C. above ambient and humidified to a relative humidity (RH) of at least 75%. This last mentioned method is very practical and is considered the preferred way of carrying out the process of this invention. However, if RH of the purge gas is less than about 75%, the viscosity stability of carboxylic acid copolymers can be adversely affected unless additional water is added directly to and retained by the copolymer. Use of air having sufficient relative humidity does not have any adverse effect on the physical properties of those copolymers. Preferably, the pellets are first dried of free surface moisture and, if necessary, are purged of excessive residual monomers while being exposed to a stream of purge gas having the required RH. It is to be noted that it would be possible theoretically in certain climates to use ambient humid air without preheating or humidifying it. However, as a practical matter, such an operation would take considerably longer than is industrially desirable or acceptable. While a purge of 10-24 hours, especially 18-24 hours, is at present practiced routinely, purging with humid air at ambient temperature, even as high as 38° C., which sometimes prevails in certain areas of the world, would take much longer, likely several more hours, in order to remove all ethylene monomer.

The stabilized carboxylic acid copolymers are packed for shipment as treated, without any further workup, under conditions where a sufficient moisture level, at least 20% above the level attainable with purge gas heated to at least 5° C. above ambient temperature, will be maintained.

A further improvement of carboxylic acid copolymer stability is obtained by carrying out the copolymerization in the presence of a telogen at a temperature at least 15° C. lower that the maximum temperature required for the desired molecular weight or melt index when no telogen is present. When this improvement is practiced, the feed temperature can also be lowered by a like amount, if it is desired to maintain constant conversion and molecular weight distribution. Polymer chemists and engineers working in the field of ethylene copolymers would be able to select a suitable telogen and would know how to select the suitable temperature. Telogens commonly employed in such copolymerizations include, e.g., propane, acetone, and propylene, and usual copolymerization temperatures are about 200°-270° C.

Reducing the copolymerization temperature increases the proportion of adjacent pendant carboxyl groups in the polymer chain. During melt processing, those adjacent carboxyl groups tends to react with one another to form the corresponding anhydride groups, with evolution of water, The presence of this moisture produced in situ inhibits inter-chain anhydride cross-linking, thus contributing further to viscosity stabilization.

This invention is now illustrated by examples of certain representative embodiments thereof, where all parts, proportions, and percentages are by weight unless otherwise indicated.

EXAMPLE 1

Melt index stability (MIS) of plant run pelletized copolymer of ethylene with methacrylic acid (MAA) containing 9% of MAA (two different lots designated, respectively, as Copolymer A and Copolymer B) was determined as follows:

$$MIS = \frac{\text{melt index after thermal holdup}}{\text{melt index before thermal holdup}},$$

where the thermal holdup was 290° C. for 30 minutes. Under these conditions, the copolymer crosslinks. Therefore, when the melt index (MI) is subsequently measured at 190° C. and compared to the initial MI, the above ratio is always less than 1.0. The thermal treatment is carried out in an anaerobic chamber and, for convenience, in a melt indexer barrel set at 290° C., which is the normal extrusion-coating temperature. The tests were run under three sets of copolymer pellet conditions: (1) purged for 18 hours with ambient air heated from 20° C. to 43° C. (thus having its RH reduced below 30%) and packaged according to the normal commercial procedure; (2) vacuum dried for 24 hours; and (3) exposed for 24 hours to air at 100% RH at a temperature of 38° C. All melt index stability data were obtained at 290° C. after 30 minutes. The results were as follows:

|  | (1) As packaged | | (2) Vacuum dried | | (3) Moist air purged | |
| --- | --- | --- | --- | --- | --- | --- |
|  | Water ppm | MIS | Water ppm | MIS | Water ppm | MIS |
| Copolymer A | <100 | 0.31 | 85 | 0.29 | 185 | 0.45 |
| Copolymer B | <100 | 0.47 | 72 | 0.46 | 272 | 0.68 |

These results show the beneficial effect of higher copolymer moisture content on MIS.

EXAMPLE 2

Here, pelletized Copolymer C, another commercial ethylene copolymer containing 9% of MMA, was dipped in water, and its melt index stability was determined as before. The results were as follows:

| Treatment | MIS |
| --- | --- |
| None (as packaged) | 0.40 |
| 10 min. in boiling water, then surface air-dried for 60 min. | 0.73 |
| 10 min in room temp. water, then blotted dry of surface water | 0.78 |
| 10 min in room temp. water, then blotted very dry of surface water | 0.56 |

The above data show the effectiveness of various methods of treatment of copolymer with water in improving MIS.

EXAMPLE 3 (comparative)

Plant production Copolymer C containing a small amount of moisture retained from underwater cutting was purged with ambient air heated more than 5° C. to 43° C. and not further humidified. to remove ethylene. Melt index stability results showed reduced stability, as follows.

| Before air purge | | After air purge | |
| --- | --- | --- | --- |
| Copolymer water content, ppm | MIS | Copolymer water content, ppm | MIS |
| 96 | 0.53 | 50 | 0.36 |
| 145 | 0.5 | 51 | 0.40 |

EXAMPLE 4

Pelletized plant production Copolymer C was exposed to humid air with the following results. The first run is comparative. In all three runs, the temperature of the purge air was more than 5° C. above ambient.

| Treatment | Copolymer water content, ppm | MIS |
| --- | --- | --- |
| Dry air purge (heated to 43° C., <30% RH), about 18 hrs. | 50 | 0.40 |
| 8 Hr. purge with 90% RH air at 42° C. | >100 | 0.50 |
| 22 Hr. purge with 100% RH air at 43° C.* | 111 | 0.53 |

*Du Pont NUCREL ® commercial copolymer (9% MAA, MI = 10)

I claim:

1. A process for improving the viscosity stability of an ethylene copolymer, being a copolymer of ethylene with at least one comonomer which is an ethylenically unsaturated carboxylic acid, said process consisting in exposing the solid, pelletized copolymer to moisture by exposing it to a purge gas heated to a temperature of at least 5° C. above ambient and humidified to a relative humidity of at least 75%, for a sufficient period to cause the copolymer to retain at least 20 weight % more moisture than it would retain after purging it for 18 hours with air or nitrogen that has been heated to a temperature at least 5° C. above ambient and has not been further humidified after being heated to a temperature of at least 5° C. above ambient.

2. The process of claim 1 wherein the carboxylic acid comonomer in the ethylene copolymer is acrylic acid or methacrylic acid.

3. The process of claim 2 wherein the content of carboxylic acid comonomer in the ethylene copolymer is 5-20 weight percent.

4. The process of claim 1 wherein the copolymer is exposed to a purge gas selected from the group consisting of air and nitrogen.

* * * * *